(12) United States Patent
Smith

(10) Patent No.: US 8,376,380 B2
(45) Date of Patent: Feb. 19, 2013

(54) TRACTION DEVICE

(76) Inventor: Kim H. Smith, Cedar Hill, TX (US)

( * ) Notice: Subject to any disclaimer, the term of this patent is extended or adjusted under 35 U.S.C. 154(b) by 252 days.

(21) Appl. No.: 12/969,553

(22) Filed: Dec. 15, 2010

(65) Prior Publication Data

US 2012/0153591 A1 Jun. 21, 2012

(51) Int. Cl.
*B60G 9/00* (2006.01)
*B60G 11/00* (2006.01)

(52) U.S. Cl. ............. 280/124.104; 280/124.17; 267/260

(58) Field of Classification Search ........... 280/124.104, 280/124.17, 124.172, 124.173, 124.175, 280/124.176; 267/39, 47, 228, 229, 260
See application file for complete search history.

(56) References Cited

U.S. PATENT DOCUMENTS

| | | | | |
|---|---|---|---|---|
| 3,309,107 A * | 3/1967 | Chieger | ................. | 280/124.108 |
| 3,593,890 A * | 7/1971 | MacKinnon | ................. | 222/627 |
| 3,695,605 A * | 10/1972 | Grossi | ............. | 267/66 |
| 3,730,549 A * | 5/1973 | Turner, Jr. | .................... | 280/86.5 |
| 3,912,296 A * | 10/1975 | Allison et al. | ......... | 280/124.163 |
| 3,964,735 A * | 6/1976 | Wright et al. | ................... | 267/25 |
| 4,098,523 A * | 7/1978 | Valerio | .................. | 280/124.104 |
| 4,383,703 A * | 5/1983 | Honda et al. | ................. | 280/682 |
| 4,486,029 A * | 12/1984 | Raidel | ........................... | 280/682 |
| 4,743,044 A * | 5/1988 | Bellotti | ......................... | 280/680 |
| 5,320,192 A * | 6/1994 | Hayashida et al. | ........... | 180/414 |
| 5,354,092 A | 10/1994 | Calvert | | |
| 6,386,565 B1 | 5/2002 | Kugler | | |
| 7,360,778 B2 * | 4/2008 | Smith | ...................... | 280/124.17 |
| 7,581,741 B2 * | 9/2009 | Reineck | .................... | 280/124.17 |
| 7,918,469 B2 * | 4/2011 | Hoppert | ................. | 280/124.102 |
| 2006/0076749 A1 * | 4/2006 | Hoppert | ................. | 280/124.17 |
| 2007/0085293 A1 * | 4/2007 | Smith | ...................... | 280/124.17 |
| 2008/0066986 A1 * | 3/2008 | Ito et al. | ........................ | 180/226 |
| 2009/0212510 A1 * | 8/2009 | Hoppert | ..................... | 280/5.514 |
| 2010/0171285 A1 * | 7/2010 | Ragsdale | ................... | 280/476.1 |

* cited by examiner

*Primary Examiner* — Eric Culbreth
*Assistant Examiner* — Barry Gooden, Jr.
(74) *Attorney, Agent, or Firm* — James F. Harvey, III

(57) ABSTRACT

An improved traction device for a motor vehicle provides a rear support assembly positioned proximate to a rear axle and an adjacent portion of a leaf spring and a front rocker support assembly. The front rocker support assembly includes a front leaf spring bracket assembly attached to a selected portion of the leaf spring between the axle and the front leaf spring mount, a rocker pivotally attached to the front leaf spring bracket assembly, and a rocker head connected to an end of the rocker for engaging a lower surface of the leaf spring to limit pivotal movement of the front rocker support assembly relative to the front end of the leaf spring, and. An adjustable rigid link extends between the rear support assembly and the front rocker support assembly.

18 Claims, 2 Drawing Sheets

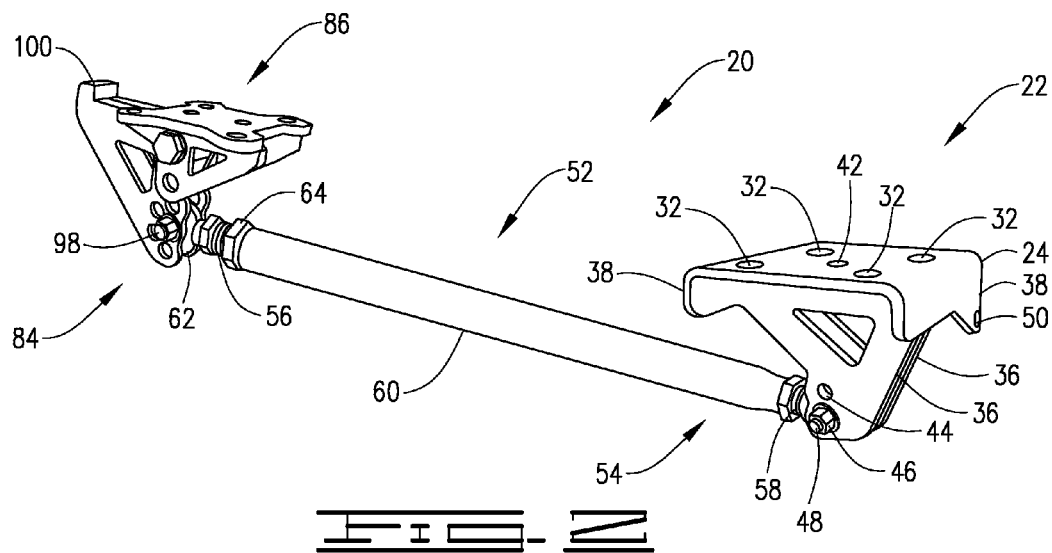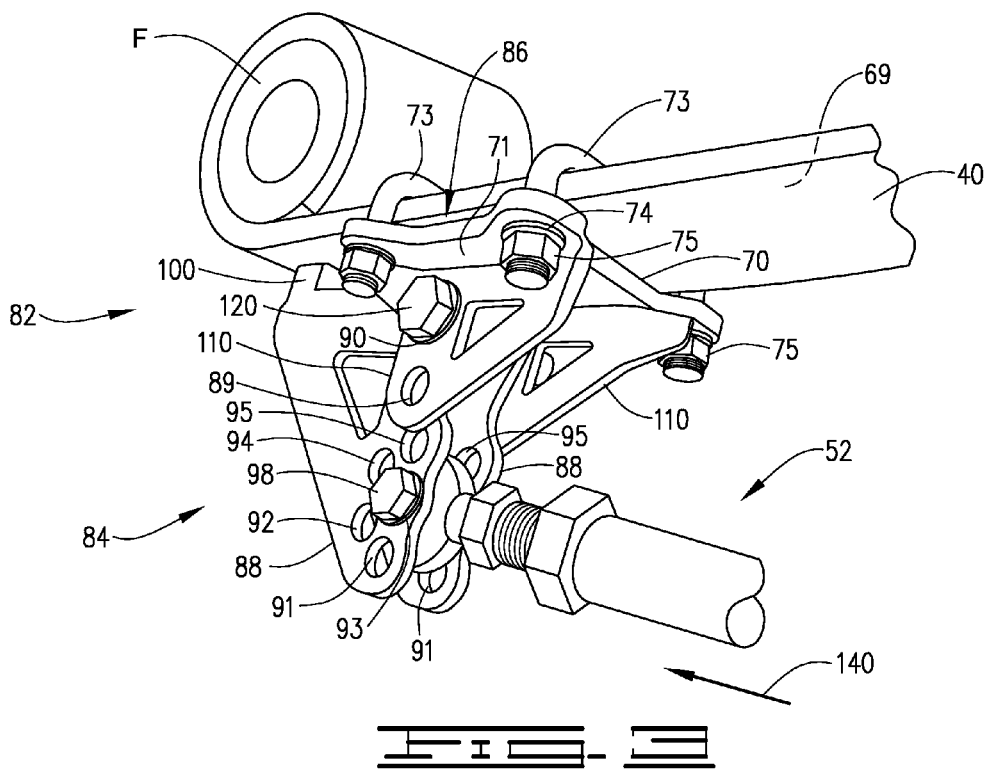

TRACTION DEVICE

BACKGROUND OF THE INVENTION

This invention relates generally to suspension systems of high performance motor vehicles. More specifically, but not by way of limitation, the present invention relates to an improved traction device for limiting wrap-up of a leaf spring of a motor vehicle during acceleration.

Conventional leaf springs are widely used in rear-wheel drive vehicles. During acceleration, the leaf spring is subject to twisting forces which are opposite in direction to the acceleration of the drive wheels. The opposed twisting forces are commonly referred to as "wrap-up" and often contribute to rear wheel "hop".

A number of devices have been designed to minimize leaf spring wrap-up and rear-wheel hop during acceleration. One of these is a simple bolt-on traction bar. A rigid bar, generally of steel, has a mounting pad on one end for attachment to the point at which the rear axle meets the leaf spring assembly. A rubber "snubber" at the other end is used to attach the rigid bar to the front eye of the leaf spring. The length of the bar extends forward from the mounting pad to a point under the front leaf spring eye. During acceleration, the counter-rotation of the rear axle is arrested when the snubber meets the spring eye. Bolt-on traction bars decrease leaf spring wrap-up, help to prevent rear wheel hop, and aid in improving rear wheel traction during acceleration. Additionally, the bolt-on traction bars are typically relatively inexpensive and easy to install.

Several other devices have been devised which represent improvements over the bolt-on traction bar. One such device is the ladder bar and another is the 4-link system. The ladder bar device comprises two mounting assemblies. One end of each mounting assembly is welded to the rear axle housing and the other is welded to a forward point of the chassis. These mounting assemblies are interconnected by a tubing structure. The 4-link system, which sometimes eliminates the conventional leaf spring from the motor vehicle, utilizes two 2-link assemblies (one on each side). One end of each 2-link assembly is welded to the rear axle housing and the other end is welded to a forward location on the chassis. Adjustable tubular links connect the rear axle housing to the chassis.

Each of these improved devices reduces leaf spring wrap-up and rear wheel hop, improves traction, and adjusts the instant center (the point at which the rear wheels push the vehicle forward). The ladder bar and the 4-link system, which are more expensive than simple bolt-on traction bars, require professional installation.

In U.S. Pat. No. 5,354,092, issued to Calvert, an improved traction bar includes a rear support assembly attached to the rear axle and the leaf spring and a front support assembly pivotally attached to the front end of the leaf spring. A rigid link extends between the rear support assembly and the front support assembly. The front support assembly is attached to the front of the leaf spring by a bushing which extends through the eye of leaf spring. The front support assembly includes a pivot stop which engages the upper surface of the leaf spring and limits movement of the front support assembly relative to the front end of the leaf spring. The pivotal movement limiting means includes means for engaging an upper surface of the leaf spring in the form of a pivot stop which extends across the upper surface of the leaf spring. The front support assembly includes a pair of generally triangular pivot plates which are pivotally attached to the front end of the leaf spring. The triangular pivot plates support the pivot stop at a fixed distance from the front end of the leaf spring and provide a point of attachment for the rigid link below the front end of the leaf spring. The pivot plates are secured to one another by three bolts positioned generally adjacent to the three corners of the triangular plates. The bolts serve to provide a pivot axis for the front support assembly relative to the front end of the leaf spring, the pivot stop itself, and the location of the point of attachment of the rigid link to the front support assembly. The rigid link is adjustable in length through the use of a threaded front eye connector and an oppositely threaded rear eye connector. Rotation of the rigid link thus changes the overall length of the rigid link.

While providing some improvement in leaf spring wrap-up, rear wheel hop, traction, and movement of the instant center forward with respect to the rear axle, the Calvert patent's effectiveness is limited by the structure of the front support assembly. The use of triangular pivot plates restricts the location of the pivot stop on the top surface of the leaf spring to a position comparatively close to the front eye of the leaf spring. Optional mounting apertures in the triangular pivot plates permit limited optional location of the threaded front eye connector of the rigid link, but additional adjustability is always helpful.

As can be seen, there is a need for a traction device for motor vehicles which is more effective in preventing leaf spring wrap-up and rear wheel hop by moving the vehicle instant center forward with respect to the rear axle and, simultaneously, improving traction during hard acceleration.

SUMMARY OF THE INVENTION

A traction device for a motor vehicle is provided, where the traction device comprises an adjustable link having a first attachment eye on an end of the adjustable link and a second attachment eye on an opposite end of the adjustable link; a rear support assembly positioned proximate to a rear axle and an adjacent portion of a leaf spring, where the rear support assembly comprises a rear support attachment means for attaching the rear support assembly against a lower surface of the leaf spring, and a rear attachment means for pivotal connection with the second attachment eye of the adjustable link; a front rocker support assembly that comprises the following: a front leaf spring bracket assembly removably attached a selected portion of the leaf spring between the axle and the front leaf spring mount, the leaf spring bracket assembly positioned against the lower surface of the leaf spring; a rocker subassembly pivotally attached to the front leaf spring bracket assembly, the rocker subassembly extending in a forward direction and terminating with a rocker head that bears on the lower surface of the leaf spring; and front attachment means for pivotal connection with the first attachment eye of the adjustable link.

In addition, a traction device is provided for limiting wrap-up of a leaf spring of a motor vehicle under acceleration, where the vehicle has a rear axle and the leaf spring has a front leaf spring mount in front of the rear axle and a rear leaf spring mount to the rear of the rear axle. The traction device comprises: a rear support assembly positioned proximate the rear axle, where the rear support assembly comprises: a flanged bracket bolted in place adjacent the leaf spring opposite the rear axle, and a rear mount bracket extending downwardly from a flanged bracket, with the rear mount bracket providing, at its lower end, an attachment means for connecting another member to the rear support assembly; a front rocker support assembly attached to a portion of the leaf spring between the axle and the front leaf spring mount, where the front rocker support assembly further comprises: a front leaf spring bracket assembly abutting a lower surface of the leaf spring; a rocker subassembly supported for pivotal movement by the front leaf spring bracket assembly, the rocker subassembly extending in a forward direction for a selected distance and terminating with a rocker stop for engaging a lower surface of the leaf spring to limit pivotal movement of the rocker subassembly; and a rocker attachment means for attaching a rigid link to the rocker; and a rigid link extending between the attachment means of the rear support assembly and the attachment means of the front support assembly.

A method for limiting wrap-up of a leaf spring on acceleration of a motor vehicle is also provided, where the method comprises the steps of: providing a traction device comprising a rear support assembly; a front rocker support assembly further comprising a front leaf spring bracket and a rocker pivotally attached to the front leaf spring bracket, with the rocker having a rocker head abutting a bottom surface of the leaf spring; and a rigid link extending between an attachment means of the rear support assembly and an attachment means of the rocker; selecting a portion of the leaf spring between an axle and a front leaf spring mount; removably attaching a front leaf spring bracket subassembly to the bottom surface at the selected portion of the leaf spring without disengaging the front leaf spring mount from the vehicle; and removably attaching the rear leaf spring bracket subassembly to the bottom surface of the leaf spring immediately adjacent the axle; wherein torque exerted by the wheels longitudinally along the rigid link forces the front leaf spring bracket subassembly downwardly while the rocker head exerts an upward force against the bottom surface of the leaf spring with the rocker head serving as a fulcrum to redirect the force downwardly against the leaf spring.

These and other features, aspects, and advantages of the present invention will become better understood with reference to the following drawings, description, and claims.

BRIEF DESCRIPTION OF THE DRAWINGS

FIG. 2 is another view of the traction device shown in FIG. 1, according to an embodiment of the invention; and FIG. 3 is a view of the front rocker assembly of the traction device shown in FIGS. 1-2 with the rear portion cut away, according to an embodiment of the invention.

DETAILED DESCRIPTION OF THE INVENTION

Figure 1:
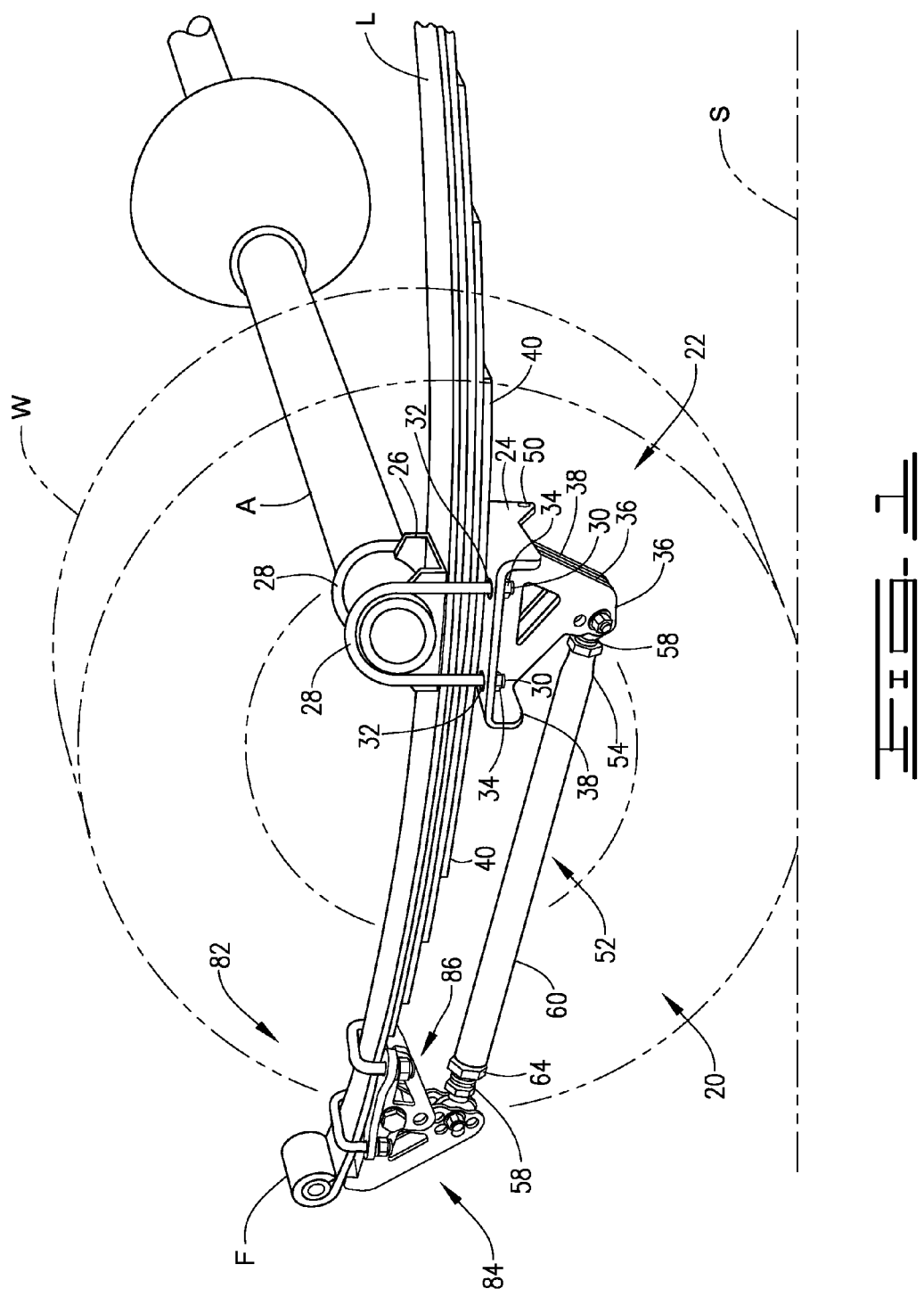
FIG. 1 shows the traction device adjacent to a leaf spring supporting a rear axle of a motor vehicle, according to an embodiment of the invention.

In the following description of the of the present invention, like numerals and characters designate like elements throughout the figures of the drawings.

Referring to FIG. 1, an improved traction device 20 may be attached to a standard leaf spring L and a rear axle A. The rear axle A may support a wheel W in contact with a road surface S. The leaf spring L may include a rear leaf spring mount R (not shown) supported by the motor vehicle chassis and a front leaf spring eye E (not shown) supported by a front leaf spring mount F attached to the motor vehicle chassis. It will be appreciated by one skilled in the art that the standard leaf spring L, the rear axle A, the wheel W, the rear leaf spring mount R, the front leaf spring eye E, the front leaf spring mount F, and the motor vehicle chassis are typical and, therefore, no illustration is necessary.

The improved traction device 20 may include a rear support assembly 22, a rigid link assembly 52, and a front rocker support assembly 82. Referring now to the rear support assembly 22, a flanged bracket 24 may cooperate with a leaf spring axle bracket 26 to receive the leaf spring L therebetween. U-bolts 28 may encircle the axle A. Threaded ends 30 of the U-bolts 28 may extend through apertures 32 in the flanged bracket 24. The U-bolts 28 may be held in place by nuts 34. Parallel tabs 36 may project downwardly from the flanged bracket 24. The flanged bracket 24 may include at least four apertures 32 through which the U-bolts 28 extend. Front and rear flanges 38 at the forward and rearward edges of the flanged bracket 24 may extend downwardly away from the leaf spring lower surface 40. A fifth aperture 42 (see FIG. 2) may be provided in the flanged bracket 24 for the leaf spring bolt, if necessary. The parallel tabs 36 may be generally triangular in shape and include two pairs of aligned apertures 44-44 and 46-46 at their lower ends for receiving a nut-bolt assembly 48 to secure a rear end 54 of the rigid link assembly 52 therein. Apertures 50 (only one shown) in the front and rear flanges 38 may provide a convenient mounting location for a shock absorber (not shown).

It will be understood by one skilled in the art that the rear support assembly 22 described herein is a modification of a support assembly well known in the art. The present improved traction device 20 according to applicant's invention may include optional aligned apertures 44-44 and 46-46 in the downwardly extending tabs 36 for attachment of the rear end 54 of the rigid link assembly 52. The second pair of aligned apertures may provide further flexibility and adjustability in implementation of the improved traction device 20, according to applicant's invention.

Referring to FIG. 1 and FIG. 2, the rigid link assembly 52 may be employed to connect the rear end support assembly 22 with the front rocker support assembly 82. The rigid link assembly 52 may have a rear end portion 54 attached to the rear support assembly 22 and a front end portion 56 attached to the front rocker support assembly 82. A rear eye connector 58 may be threaded into a rigid bar 60 at the rear end 54 of the rigid link assembly 52, and a front eye connector 62 may be threaded into the rigid bar at the front end portion 56 of the rigid link assembly 52. The rigid bar 60 may be typically constructed by welding internally oppositely threaded front and rear inserts into the ends of a rigid bar. Oppositely internally threaded ends of the rigid bar 60 permit the rigid bar to be operated like a turnbuckle. i.e. the rigid bar 60 may be turned one direction to increase the distance between the eye portions of the eye connectors 58, 62 or the rigid bar 60 may be turned the opposite direction to shorten the distance between the eye portions of the eye connectors 58, 62. An external hex fitting 64 may be provided to permit easy adjustment of the rigid bar 60.

It will be understood that the rigid link assembly 52 described herein is well known in the art. A rotatable bushing may be typically deployed within the eye of the eye connectors 58, 62. Because the implementation of the rigid link assembly 52 shown herein is well known to persons skilled in the art, the rigid link assembly 52 will not be described in great detail.

Referring now to FIG. 1, FIG. 2, and FIG. 3, the front rocker support assembly 82 may include a rocker subassembly 84 pivotally attached to a front leaf spring bracket subassembly 86. The rocker subassembly 84 may be formed by a pair of identical, generally triangular plates 88 permanently arranged in parallel relationship to a cylindrical spacer (not shown) with an axial channel therethrough. The axial channel may be aligned with a pair of aligned pivot bolt apertures, identified here by way of example as 89-89 and 90-90, near one corner of each of the triangular plates 88 for pivotal movement of the rocker subassembly 84. The number of pairs of aligned pivot bolt apertures may be arbitrary and dependent upon the size of the triangular plates 88. The rocker subassembly 84 may also have a plurality of pairs of aligned link positioning apertures, identified here by way of example as 91-91, 92-92, 93-93, 94-94, and 95-95, along a side common with the pivot bolt apertures 89-89 and 90-90. The number of pairs of aligned link positioning apertures may be arbitrary and dependent upon the size of the triangular plates 88. The aligned link position apertures may be positioned in a downwardly extending portion of the parallel triangular plates 88. In FIG. 3, the front eye connector 62 of the rigid link assembly 52 may be attached to the rocker subassembly 84 by a nut-bolt assembly 98 disposed through the eye of the eye connector 62 and a selected pair of aligned link positioning apertures (91-91, 92-92, 93-93, 94-94, and 95-95) as designated above. The rocker subassembly 84 may further include a transverse rocker head 100 located at the third corner of the parallel triangular plates 88. The transverse rocker head 100 may bear on the lower surface 69 of the leaf spring L.

The rocker subassembly 84 may be pivotally attached to the front leaf spring bracket subassembly 86 in a manner described below. The front leaf spring bracket subassembly 86 may include a generally horizontal plate 70 having a lower surface 71 from which two identical substantially parallel elongated plates 110 depend. The horizontal plate 70 may be removably secured against the lower surface 40 of the leaf spring L by a plurality of U-bolts 73 that each extend from the horizontal plate 70 over a spring leaf upper surface 69 and back to the horizontal plate 70. Each U-bolt 73 may be inserted through holes 74 in the horizontal plate 70 and secured thereto. For example, the ends of each U-bolt 73 may be threaded to receive a nut 75 and washer so that it may draw the horizontal plate 70 against the lower surface 40 of the leaf spring for secure positioning without removal of either end of the leaf spring L. Other means of removably securing the horizontal plate 70 of the front leaf spring bracket subassembly 86 against the leaf spring L without departing from the scope of the invention.

Referring again to FIG. 3, the elongated plates 110 of the front leaf spring bracket subassembly 86 may be spaced apart a distance sufficient to allow the triangular plates 88 of the front rocker subassembly 84 to be inserted therebetween without frictional binding. The pair of elongated plates 110 may have a plurality of pairs of upper aligned apertures, indicated by way of example as 112-112 and 114-114. A selected pair of upper aligned apertures (91-91, 92-92, 93-93, 94-94, or 95-95) may receive a nut-bolt assembly 120 that may be inserted through the selected upper aligned aperture and both the selected pair of aligned pivot bolt apertures (89-89 or 90-90) in the triangular plates 88 and the axial channel of the cylindrical spacer, so as to allow the rocker subassembly 84 to pivot freely about the nut-bolt assembly 120.

The improved traction device 20 may be installed according to the following procedure. A portion of the leaf spring L between the axle A and the front leaf spring mount F may be selected for mounting the front leaf spring bracket subassembly 86. This location may be selected according to criteria which may vary from vehicle to vehicle, e.g. load distribution of the vehicle, torque produced on the rear wheels by the drive train, length of the overall leaf spring, desired performance of the vehicle under acceleration, etc. These criteria may be known in advance or may be determined by experimentation.

Then, the front leaf spring bracket subassembly 86 may be removably attached to the bottom surface of the selected portion of the leaf spring L that extends between the axle A and the front leaf spring mount F without disengaging the front leaf spring mount F from the vehicle. This may be accomplished by placing the U-bolts of the front leaf spring bracket subassembly 86 over the upper surface 69 of the leaf spring L so that the downwardly depending ends of the U-bolt 73 may be inserted through the holes 74 of the horizontal plate 70 held against the lower surface 40 of the leaf spring L and secured to the horizontal plate 70 by nuts 75. The nuts 75 may be tightened sufficiently so that frictional engagement of the horizontal plate 70 against the lower surface 40 is sufficient to prevent the horizontal plate 70 from moving longitudinally along the leaf spring L.

The rocker subassembly 84 may in turn be pivotally attached to the front leaf spring bracket subassembly 86 by the nut-bolt combination 120 disposed simultaneously through a selected upper aligned aperture, the selected pair of aligned pivot bolt apertures (89-89 or 90-90) in the triangular plates 88, and the axial channel of the cylindrical spacer, so as to allow the rocker subassembly 84 to pivot freely about the nut-bolt assembly 120.

The rear support assembly 22 may then be attached to an area of the leaf spring L below the rear axle A by positioning the flanged bracket 24 on the lower surface 40 of the leaf spring L with U-bolts 28 encircling the axle A. The threaded ends 30 of the U-bolts 28 may extend through apertures 32 in the flanged bracket 24 and secured by nuts 34.

Next, the eye of eye connector 58 of rigid bar 60 may be positioned between the parallel tabs 36 of the flanged bracket 24 and secured for pivotal movement by a nut-bolt assembly 48 inserted through the eye connector 58 and a selected pair of aligned apertures 44-44 or 46-46. The other eye connector 62 of the rigid bar 60 may be positioned between the triangular plates 88 of the rocker subassembly 84 and secured for pivotal movement by nut-bolt assembly 98 inserted through the eye of the eye connector 62 and a selected pair of aligned link positioning apertures (91-91, 92-92, 93-93, 94-94, or 95-95).

Finally, the rigid bar 60 of the rigid link assembly 52 may then be turned to lengthen or shorten the rigid link assembly 52, so that the rocker head 100 bears on the lower surface 40 of the leaf spring L.

It should be noted that the previously enumerated steps for installing the improved traction device 20 on a vehicle may be performed in different orders without departing from the scope of the invention. Also, some steps of the procedure may be omitted since the improved traction device 20 may be shipped in a partially assembled state, without departing from the scope of the invention. The installation procedure is illustrative and given as an example only to better understand the device and the factors that may influence the installation.

In operation, force may be directed along arrow 140 during acceleration. The force directed along arrow 140 may be transferred through the rocker subassembly 84 to the front leaf spring bracket subassembly 86. The front leaf spring bracket subassembly 86 may be forced downwardly while the rocker head 100 exerts an upward force against the lower surface 40 of the leaf spring L. With the rocker head 100 serving as a fulcrum, the force directed along arrow 140 is now applied downwardly against the upper surface 69 of the leaf spring L.

Referring again to FIGS. 1-3, Those persons skilled in the art may understand that, as the force originally applied along the arrow 140 is applied farther to the rear with respect to the front leaf spring mount F, greater benefit will be derived from the traction device of the present invention. This positioning towards the rear may be accomplished by a selected installation of the rocker subassembly 84, extending the distance between rocker head 100 and the pivot location (nut-bolt assembly 120), or a combination of the two.

During installation of the improved traction device 20 of the present invention, it is possible to pre-load either wheel W by initially adjusting the front rocker support assembly 82 so the rocker head 100 is forced against the lower surface 40 of the leaf spring L while the vehicle is stopped. Moreover, selective adjustment of left and right traction devices can adjust for traction differences between the left wheel and the right wheel of a vehicle.

From the foregoing, it will be understood by persons skilled in the art that an improved traction device has been provided. The invention is relatively simple and easy to manufacture, yet affords a variety of uses. While the description contains many specifics, these should not be construed as limitations on the scope of the invention, but rather as an exemplification of the preferred embodiments thereof. The foregoing is considered as illustrative only of the principles of the invention. Further, because numerous modifications and changes will readily occur to those skilled in the art, it is not desired to limit the invention to the exact construction and operation shown and described, and accordingly all suitable modifications and equivalents may be resorted to, falling within the scope of the invention. Although this invention has been described in its preferred form with a certain degree of particularity, it is understood that the present disclosure of the preferred form has been made only by way of example and numerous changes in the details of construction and combination and arrangement of parts may be resorted to without departing from the spirit and scope of the invention.

We claim:

1. A traction device for a motor vehicle, comprising:
    an adjustable link having a first attachment eye on an end of the adjustable link and a second attachment eye on an opposite end of the adjustable link;
    a rear support assembly positioned proximate to a rear axle and an adjacent portion of a leaf spring, the rear support assembly comprising:
        a rear support attachment means for attaching the rear support assembly against a lower surface of the leaf spring; and
        a rear attachment means for pivotal connection with the second attachment eye of the adjustable link;
    a front rocker support assembly comprising:
        a front leaf spring bracket assembly removably attached a selected portion of the leaf spring between the axle and a front leaf spring mount, the front leaf spring bracket assembly positioned against the lower surface of the leaf spring;
        a rocker subassembly pivotally attached to the front leaf spring bracket assembly, the rocker subassembly extending in a forward direction and terminating with a rocker head that bears on the lower surface of the leaf spring; and
        front attachment means for pivotal connection with the first attachment eye of the adjustable link.

2. The traction device of claim 1, wherein the rear support assembly includes a flanged bracket bolted in place adjacent to the leaf spring opposite to the rear axle.

3. The traction device of claim 2, wherein the rear support assembly includes a rear mount bracket which extends downwardly from the flanged bracket, wherein the rear mount bracket provides, at its lower end, attachment means for connecting the second end of the adjustable link to the rear support assembly.

4. The traction device of claim 3, wherein the rear support assembly includes a pair of rear mount brackets, wherein the second end of the adjustable link is bolted in place between the lower ends of the rear mount brackets.

5. The traction device of claim 1, wherein the adjustable link includes means for adjusting a length thereof while the traction device is mounted on the leaf spring.

6. The traction device of claim 5, wherein the adjustable link comprises an elongated bar wherein the first attachment eye is a front eye connector threaded into a front end of the elongated bar, and the second attachment eye is a rear eye connector threaded into a rear end of the elongated bar.

7. The traction device of claim 6, wherein the front eye connector is bolted to the attachment means of the front support assembly, and wherein the rear eye connector is bolted to the rear support assembly.

8. The traction device of claim 7, wherein the front and rear eye connectors are threaded oppositely into the elongated bar such that rotation of the elongated bar about its longitudinal axis changes the overall length of the adjustable link.

9. The traction device of claim 1, wherein substantially parallel elongated plates of the front leaf spring bracket assembly include alternate locations for the pivot attachment.

10. A traction device for limiting wrap-up of a leaf spring of a motor vehicle under acceleration, the vehicle with a rear axle, the leaf spring having a front leaf spring mount in front of the rear axle and a rear leaf spring mount rearward of the rear axle, the traction device comprising:
    a rear support assembly positioned proximate the rear axle, the rear support assembly comprising:
        a flanged bracket bolted in place adjacent the leaf spring opposite the rear axle, and
        a rear mount bracket extending downwardly from the flanged bracket, the rear mount bracket providing, at its lower end, attachment means for connecting a rigid link to the rear support assembly;
    a front rocker support assembly attached to a portion of the leaf spring between the axle and the front leaf spring mount, the front rocker support assembly further comprising:
        a front leaf spring bracket assembly abutting a lower surface of the leaf spring;
        a rocker subassembly supported for pivotal movement by the front leaf spring bracket assembly, the rocker subassembly extending in a forward direction for a selected distance and terminating with a rocker stop for engaging the lower surface of the leaf spring to limit pivotal movement of the rocker subassembly; and
        a rocker attachment means for attaching the rigid link to the rocker; and
    the rigid link extending between the attachment means of the rear support assembly and the attachment means of the front support assembly.

11. The traction device of claim 10, wherein the rear support assembly comprises a pair of rear mount brackets, wherein a rear end of the rigid link is bolted in place between lower ends of the rear mount brackets, and a mount for receiving a lower end of a shock absorber.

12. The traction device of claim 10, wherein substantially parallel elongated plates define spaced location of the rocker attachment means from the front end of the leaf spring, below a front end of the leaf spring.

13. The traction device of claim 10, wherein a length of the rigid link is adjustable.

14. The traction device of claim 13, wherein the rigid link comprises:
    an elongated bar having a front eye connector threaded into a front end of the elongated bar, and
    a rear eye connector threaded into a rear end of the elongated bar;

wherein the front eye connector is bolted to the attachment means of the front support assembly and the rear eye connector is bolted to the attachment means of the rear support assembly, and wherein the front and rear eye connectors are threaded oppositely into the elongated bar such that rotation of the elongated bar about its longitudinal axis changes the overall length of the rigid link.

15. The traction device of claim 10, wherein substantially parallel elongated plates of the front leaf spring bracket subassembly include alternate locations for the supported pivotal moment.

16. A traction device for limiting wrap-up of a leaf spring on acceleration of a motor vehicle, the device comprising:
- a rear support assembly positioned proximate a rear axle of the vehicle, the rear support assembly including a flanged bracket bolted against a lower surface of the leaf spring opposite the rear axle, and a pair of rear mount brackets extending downwardly from the flanged bracket to provide, at their lower ends, attachment means for connecting a rigid link to the rear support assembly;
- a front rocker support assembly removably attached to a portion of the leaf spring between the axle and a front leaf spring mount, the front rocker support assembly further comprising:
  - a front leaf spring bracket assembly attached against the lower surface of the leaf spring by U-bolts about the leaf spring;
  - a rocker pivotally attached to the front leaf spring bracket assembly;
  - a rocker head connected to the rocker, the rocker head disposed to abut the lower surface of the leaf spring to limit pivotal excursion of the rocker relative to the front end of the leaf spring; and
  - rocker attachment means for attaching the rigid link to the rocker; and
- the rigid link extending between the attachment means of the rear support assembly and the attachment means of the rocker, the rigid link comprising:
  - an elongated bar having a front eye connector threaded into a front end of the elongated bar, and
  - a rear eye connector threaded into a rear end of the elongated bar,
  - wherein the front and rear eye connectors are threaded oppositely into the elongated bar such that rotation of the elongated bar about its longitudinal axis changes the overall length of the rigid link.

17. The traction device of claim 16, wherein the front leaf spring bracket subassembly includes alternate locations for the pivotal attachment of the rocker.

18. A method for limiting wrap-up of a leaf spring on acceleration of a motor vehicle, the method comprising the steps of:
- providing a traction device comprising:
  - a rear support assembly;
  - a front rocker support assembly comprising a front leaf spring bracket and a rocker pivotally attached to a front leaf spring bracket, the rocker having a rocker head abutting a bottom surface of the leaf spring; and
  - a rigid link extending between an attachment means of the rear support assembly and an attachment means of the rocker;
- selecting a portion of the leaf spring between an axle and a front leaf spring mount;
- removably attaching a front leaf spring bracket subassembly to the bottom surface at the selected portion of the leaf spring without disengaging the front leaf spring mount from the vehicle; and
- removably attaching a rear leaf spring bracket subassembly to the bottom surface of the leaf spring immediately adjacent the axle;
- wherein torque exerted by wheels longitudinally along the rigid link forces the front leaf spring bracket subassembly downwardly while the rocker head exerts a upward force against the bottom surface of the leaf spring with the rocker head serving as a fulcrum to redirect the force downwardly against the leaf spring.

* * * * *